(12) United States Patent
Willmann et al.

(10) Patent No.: US 8,510,009 B2
(45) Date of Patent: Aug. 13, 2013

(54) METHOD FOR CONTROLLING A VEHICLE BRAKE SYSTEM, THE SLIP OF WHICH CAN BE REGULATED ELECTRONICALLY

(75) Inventors: Karl-Heinz Willmann, Freiberg (DE); Karl-Heinz Senger, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 12/935,194

(22) PCT Filed: Jan. 27, 2009

(86) PCT No.: PCT/EP2009/050882
§ 371 (c)(1),
(2), (4) Date: Oct. 15, 2010

(87) PCT Pub. No.: WO2009/118208
PCT Pub. Date: Oct. 1, 2009

(65) Prior Publication Data
US 2011/0029215 A1    Feb. 3, 2011

(30) Foreign Application Priority Data

Mar. 28, 2008 (DE) .......................... 10 2008 000 873

(51) Int. Cl.
*B60T 8/34* (2006.01)

(52) U.S. Cl.
USPC ........................................... 701/78; 303/125

(58) Field of Classification Search
USPC ................... 701/78, 70, 83, 101–103, 90, 95, 701/85; 303/125; 180/197
See application file for complete search history.

(56) References Cited

U.S. PATENT DOCUMENTS

| 5,064,254 | A | * | 11/1991 | Benzinger et al. | .......... 303/113.2 |
| 6,027,183 | A | * | 2/2000 | Katayose et al. | .............. 303/146 |
| 6,135,575 | A | * | 10/2000 | Feigel et al. | ................ 303/113.4 |
| 6,315,371 | B1 | | 11/2001 | Wachi et al. | |
| 6,416,137 | B2 | * | 7/2002 | Hofmann et al. | .......... 303/113.4 |
| 2001/0022254 | A1 | | 9/2001 | Hofmann et al. | |

FOREIGN PATENT DOCUMENTS

| DE | 19963760 A1 | 7/2001 |
| DE | 10105645 A1 | 12/2001 |
| JP | 2000-142369 A | 5/2000 |
| JP | 2005-262997 A | 9/2005 |
| JP | 2006-256449 A | 9/2006 |
| JP | 09-254764 A | 11/2009 |
| WO | 03053755 A1 | 7/2003 |

* cited by examiner

*Primary Examiner* — Dalena Tran
(74) *Attorney, Agent, or Firm* — Maginot, Moore & Beck

(57) ABSTRACT

The invention relates to a vehicle braking system, the slip of which can be regulated electronically, for which, in the event of an automatic braking process, the activation of the foot pedal by the driver, does not result in a significant actuating path. The driver therefore disadvantageously perceives different pedal actuating characteristics in the foot actuated and automatic braking operations. According to the invention, a method is proposed for controlling a vehicle braking system, the slip of which is regulated electronically, and with which pedal actuating characteristics, which are largely uniform in the different operating states of the vehicle braking system can be produced. To achieve this, a valve unit is controlled in such a way that a pressure medium flows from the wheel brake to the pressure medium reservoir and the drive motor of the pressure generator is controlled in parallel.

20 Claims, 3 Drawing Sheets

METHOD FOR CONTROLLING A VEHICLE BRAKE SYSTEM, THE SLIP OF WHICH CAN BE REGULATED ELECTRONICALLY

CROSS-REFERENCE TO RELATED APPLICATION

This application is a 35 USC 371application of PCT/EP2009/050882 filed on Jan. 27, 2009.

BACKGROUND OF THE INVENTION

1. Field of the Invention

The invention relates to a method for controlling an electronically slip-controllable vehicle brake system.

2. Description of the Prior Art

The vehicle brake system described is capable automatically, that is, independently of what the driver is asking for and thus independently of an actuation of the foot pedal 12, of performing a braking event. In automatic braking events, the switchover valve 44 is switched by the electronic control unit 28 into the blocking position, and thus the existing hydraulic communication of the master cylinder 14 with the wheel brakes 20, 22; 24, 26 is interrupted. The buildup of the brake pressure is effected solely by a triggering of the drive motor 39 of the pressure generator 38. If during an automatic braking event of this kind the driver additionally actuates the foot pedal 12, for instance because he wants to build up a higher brake pressure than is predetermined by the system, then the driver disadvantageously perceives a pedal actuation characteristic (characteristic force/travel curve) that is altered compared to the normal service brake operating mode. The driver senses a harder, less-resilient pedal than in typical service braking events, because of the brake pressure in the vehicle brake system that has already been built up by the pressure generator 38, in combination with the switchover valve 44, kept in the blocking position, and also because of the relatively slight supply quantity of pressure fluid from the pressure generator 38 via the open high-pressure switching valve 42.

Electronically slip-controllable vehicle brake systems are prior art. Known vehicle brake systems are capable of braking individual wheels of the vehicle regardless of what the driver is asking for, for instance to bring a vehicle into a stable driving state thereby (Electronic Stability Program or ESP), to eliminate slip at the driving wheels (Traction Control or TC), or to perform adaptive control of the speed or the following distance from a vehicle ahead (Automatic Cruise Control or ACC). The structural layout, known per se, of such vehicle brake systems is shown in FIG. 1.

Accordingly, an electronically slip-controllable vehicle brake system includes a brake booster 10, actuatable by the driver by foot pedal 12, with a downstream master cylinder 14. Two identically constructed hydraulic brake circuits 16, 18 are connected to the master cylinder 14. Each brake circuit 16, 18 serves to actuate two wheel brakes 20, 22; 24, 26 each. Modulation of the brake pressure prevailing in these wheel brakes 20-26 is possible by means of magnet valves, which are triggerable by an electronic control unit 28. For that purpose, each wheel brake 20-26 is preceded hydraulically by a pressure buildup valve 30 making a pressure buildup possible and followed hydraulically by a pressure reduction valve 32 making a pressure reduction possible. The outlet of the pressure reduction valves of a brake circuit 16, 18 discharges into a common return line 34. A pressure fluid reservoir 36 is connected to this return line 34. The return line 34 leads to the intake side of a pressure generator 38, which is actuatable by a triggerable drive motor 39 and which delivers pressure fluid at elevated pressure to the pressure buildup valves 30 of the wheel brakes 20-26 and to the master cylinder 14.

The intake side of the pressure generator 38 continues to communicate with an intake line 40. The latter connects the pressure generator 38 to the master cylinder 14, in the event that the volume of pressure fluid furnished by the pressure fluid reservoir 36 should not suffice for required brake pressure buildup. The intake line 40 is controllable by a so-called high-pressure switching valve 42.

Each brake circuit 16, 18 is also equipped with a so-called switchover valve 44. It is connected between the master cylinder 14 and the pressure buildup valve 30 and serves, in the event of an automatic braking event, to decouple the master cylinder 14 hydraulically from the wheel brakes 20-26.

The magnet valves, in the electronically nontriggered state, assume their basic positions shown in FIG. 1. The high-pressure switching valve 42 and the pressure reduction valves 32 of a brake circuit 16, 18 are then located in a blocking position, while the switchover valve 44 and the pressure buildup valves 30 assume their through or open position. Upon an actuation of the foot pedal 12 by the driver, the buildup of a brake pressure in the wheel brakes 20-26 by muscle power is thus possible.

For modulating the brake pressure, for instance if one of the wheels of the vehicle is tending to lock because of an applied excessive brake pressure, the pressure buildup valve 30 of the brake circuit 16, 18 of the affected wheel is triggered by the electronic control unit 28 and switched over to its blocking position. At the same time, the pressure reduction valve 32 is put in its open position, and the drive motor 39 of the pressure generator 38 is triggered. Pressure fluid from the affected wheel brake 20-26 can as a result flow out into the pressure fluid reservoir 36, which until then is empty, and be temporarily stored there. At the same time, pressure fluid from this pressure fluid reservoir 36 is aspirated by the pressure generator 38. A pressure reduction in the wheel brake 20-26 is effected until such time as the locked wheel resumes rotary motion. This can be ascertained from wheel rotation sensors (not shown), which deliver their measurement signals to the electronic control unit 28. The aspirated pressure fluid is compressed by the pressure generator 38 and prestored in the closed pressure buildup valves 30 of a brake circuit 16, 18 or fed back into the master cylinder 14. Thus it is again available for an ensuing brake pressure increase.

The vehicle brake system described is capable automatically, that is, independently of what the driver is asking for and thus independently of an actuation of the foot pedal 12, of performing a braking event. In automatic braking events, the switchover valve 44 is switched by the electronic control unit 28 into the blocking position, and thus the existing hydraulic communication of the master cylinder 14 with the wheel brakes 20, 22; 24, 26 is interrupted. The buildup of the brake pressure is effected solely by a triggering of the drive motor 39 of the pressure generator 38. If during an automatic braking event of this kind the driver additionally actuates the foot pedal 12, for instance because he wants to build up a higher brake pressure than is predetermined by the system, then the driver disadvantageously perceives a pedal actuation characteristic (characteristic force/travel curve) that is altered compared to the normal service brake operating mode. The driver senses a harder, less-resilient pedal than in typical service braking events, because of the brake pressure in the vehicle brake system that has already been built up by the pressure generator 38, in combination with the switchover valve 44, kept in the blocking position, and also because of the relatively slight supply quantity of pressure fluid from the pressure generator 38 via the open high-pressure switching valve 42.

Different pedal actuation characteristics (characteristic force/travel curve) of the foot pedal 12, which are also dependent on the particular operating state of the vehicle brake system, make the metering of the brake pressure more difficult and can annoy the driver.

OBJECT OF THE INVENTION

It is therefore the object of the present invention to propose a method for actuating a vehicle brake system during an automatic braking operation results in at least approximately the same pedal actuation characteristic (characteristic force/travel curve) of the foot pedal compared to typical service braking events.

It is an advantage of the invention that a pedal actuation characteristic that is at least approximately the same in all operating states of the vehicle brake system is achieved, without the vehicle brake system requiring additional hydraulic components for the purpose. In the manufacture of a hydraulic block as well, of the kind typically used in known electronically slip-controlled vehicle brake systems, no additional provisions are therefore necessary, and unwanted interactions with other brake regulating functions of the vehicle brake system as a result of the invention are not to be expected. The pedal actuation characteristic that is at least approximately the same under all operating conditions of the vehicle brake system can be achieved solely by control provisions and as a result is relatively inexpensive to implement.

Further advantages or advantageous refinements of the invention will become apparent from the dependent claims or the ensuing description.

BRIEF DESCRIPTION OF THE DRAWINGS

The method on which the invention is based for controlling an electronically slip-controllable vehicle brake system will be described in conjunction with the accompanying drawings, in which.

DESCRIPTION OF THE PREFERRED EMBODIMENT

Figure 1:
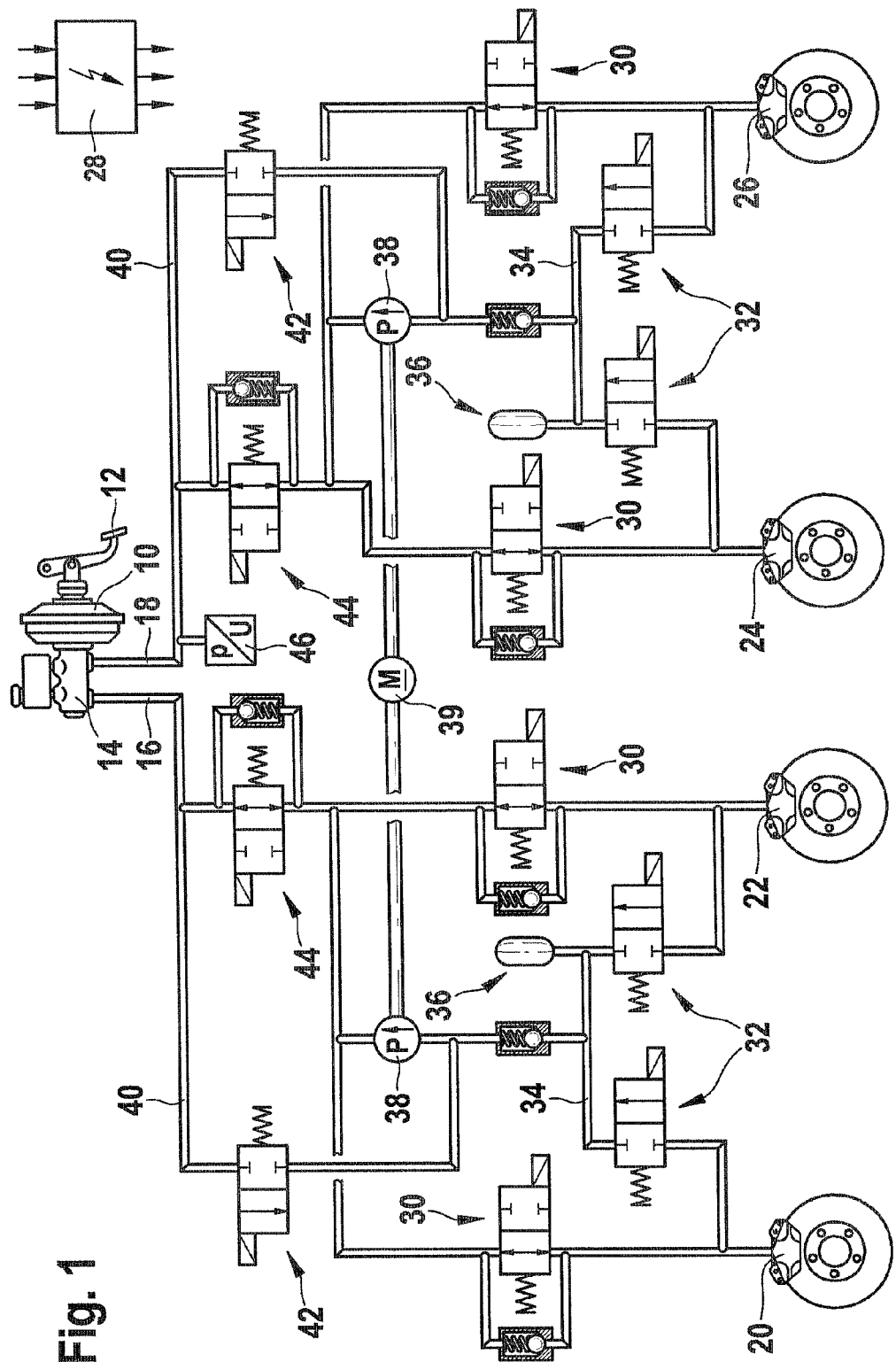
FIG. 1 shows the hydraulic circuit diagram already described of an electronically slip-controllable vehicle brake system known from the prior art, in its basic position.

The individual components of an electronically slip-controllable vehicle brake system have already been explained in conjunction with the description of FIG. 1. Below, reference will be made solely to FIGS. 2 and 3, while maintaining the reference numerals used in FIG. 1.

Figure 2:
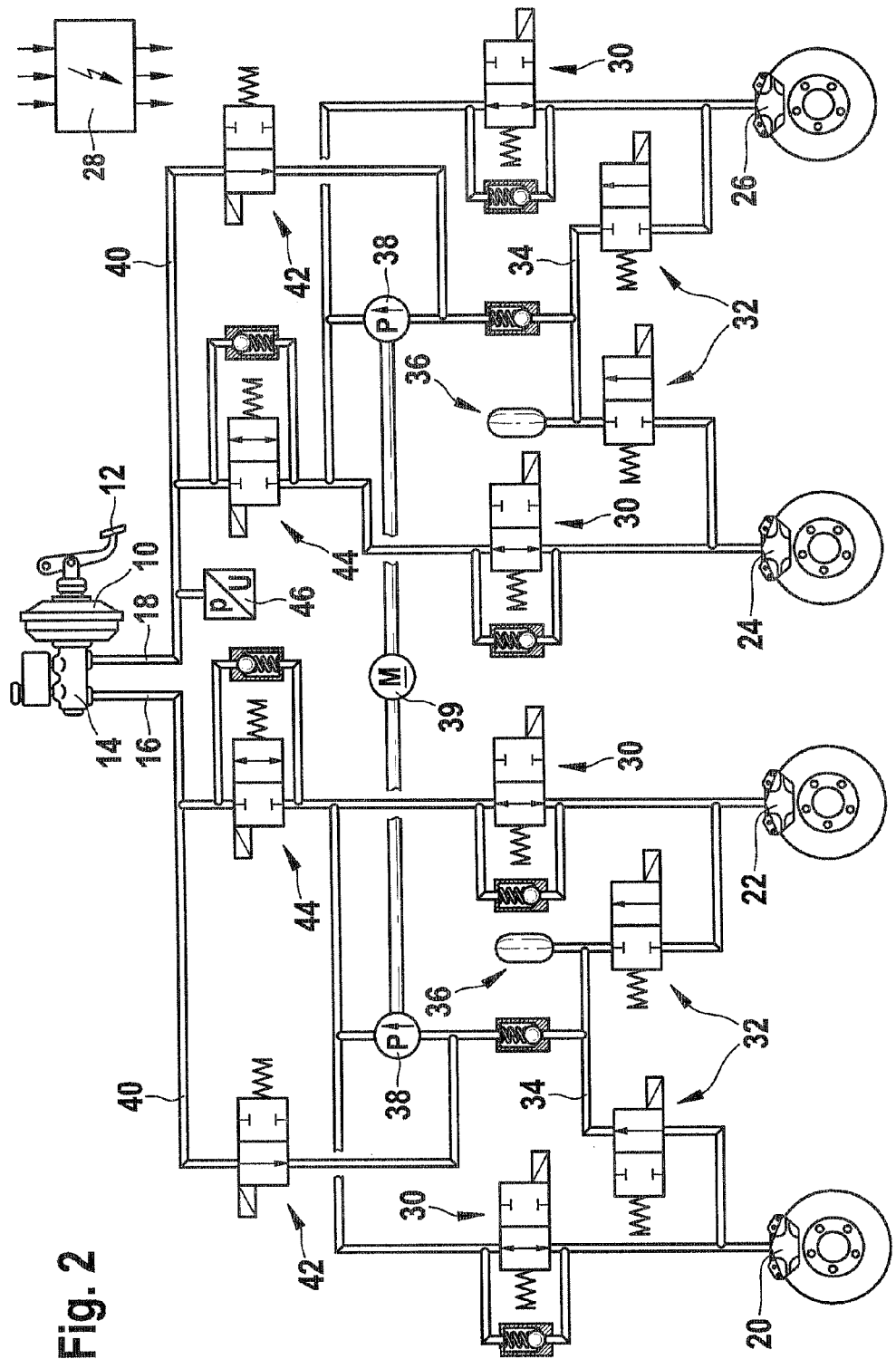
FIG. 2 shows the same vehicle brake system during an automatic braking operation, with the foot pedal 12 simultaneously actuated.

As mentioned, the vehicle brake system of FIG. 2 is in the operating state of the automatic braking mode. This operating state is distinguished, among other factors, by the fact that the switchover valve 44 is triggered by the electronic control unit 28 and switched over into its blocking position. Thus the switchover valve 44 interrupts a hydraulic communication between the wheel brakes 20-26 of a brake circuit 16, 18 and the master cylinder 14. Moreover, the high-pressure switching valve 42 is likewise triggered by the electronic control unit 28 and assumes its open position. Thus the intake side of the pressure generator 38 communicates hydraulically with the master cylinder 14, so that the pressure generator that is also triggered can aspirate additional pressure fluid from the master cylinder 14 and compress it for brake pressure generation. The compression side of the pressure generator 38 is in communication, via the open pressure buildup valves 30 that are in their basic position, with the wheel brakes 20-26 of the brake circuit 16, 18, while the pressure reduction valves 32 are initially closed, so as to permit a brake pressure buildup. In the pressure fluid reservoir 36, there is no pressure fluid; because of the blocking pressure reduction valves 32, there is no communication of the pressure fluid reservoir 36 with the wheel brakes 20-26. The foot pedal 12 is not actuated by the driver; the existing brake pressure is generated solely by the actuated pressure generator 38.

Figure 3:
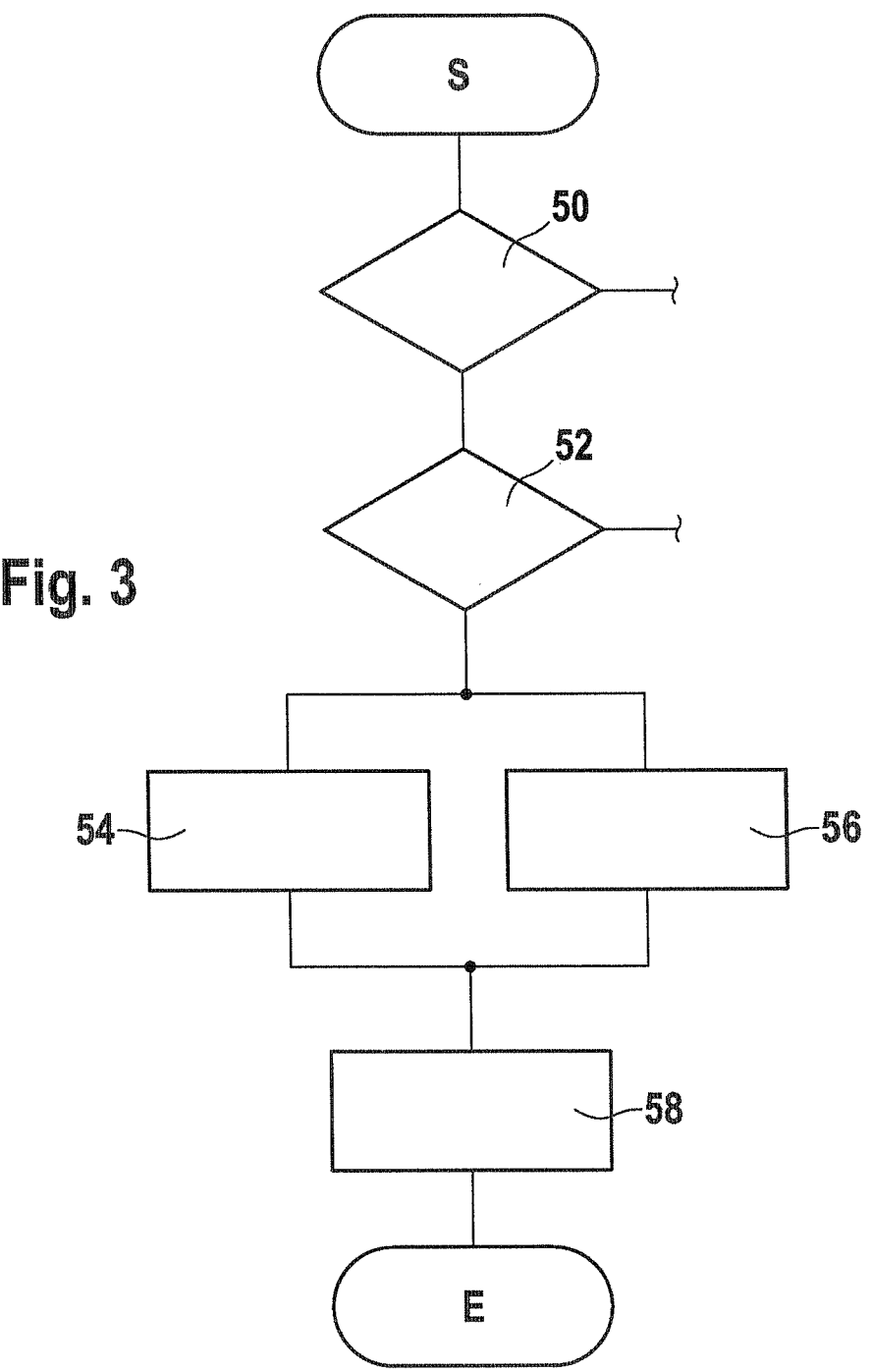
FIG. 3 shows a flow chart for illustrating the triggering method of the invention.

The first step 50 in the method of the invention in FIG. 3 comprises ascertaining the automatic braking mode of the vehicle brake system from the aforementioned electronic trigger signals of the various components.

If now, because of this automatic braking mode that is taking place, an actuation of the foot pedal 12 by the driver also takes place, for instance because the driver wants to make a greater braking deceleration, then this actuation of the foot pedal 12 can be detected, for instance by means of a pressure sensor 46, which is built into at least one of the brake circuits 16, 18 between the master cylinder 14 and the switchover valve 44 or the high-pressure switching valve 42. As a result of the actuation of the foot pedal 12, the pressure sensor 46 records a pressure increase in that part of the brake circuit 16, 18. Alternatively, a travel sensor can be used, which is coupled with the foot pedal 12 and detects its actuation travel. The output signal of the sensor 46 used, which is proportional to a vehicle deceleration that the drive is asking for, is delivered to the electronic control unit 28 and evaluated there (step 52).

If both steps 50 and 52 have led to a positive outcome in the electronic control unit 28, the control unit 28 triggers at least one of the pressure reduction valves 32 present in the brake circuit 16, 18 and switches it to the open position (step 54). As a result, pressure fluid flows out of the wheel brake 20-26, which is at the brake pressure applied, to the pressure fluid reservoir 36. A pressure drop to be expected in the wheel brake 20-26 is prevented because simultaneously with the trigger signal for the pressure reduction valves 32, the drive motor 39 of the pressure generator 38 is triggered (step 56). In the process the trigger signal for the drive motor 39 of the pressure generator 38 is calculated by the electronic control unit 28 in such a way that the resultant vehicle deceleration corresponds to the maximum value of the vehicle deceleration corresponding to the actuation of the master cylinder 14 or to the vehicle deceleration prevailing before the actuation of the master cylinder 14 (step 58). Alternatively, it would equally be possible to adapt the triggerings of the pressure build-up valve 30 and of the pressure reduction valves 32, which are done by the electronic control unit 28, and those of the drive motor 39 of the pressure generator 38 to one another in such a way that a vehicle deceleration corresponding to the actuation of the master cylinder 14 is established.

Functionally, with triggering of at least one of the pressure reduction valves 32, the hydraulic capacity of the pressure fluid reservoir 36 is added to the brake circuit 16, 18 that is at brake pressure. The pressure fluid flowing out into the pressure fluid reservoir 36 is compensated for by the actuation of the pressure generator 38. Upon an actuation of the pressure generator 38, an actuation travel for the foot pedal 12 is brought about.

In a first embodiment of the invention, pressure reduction valves 32 can be used which are embodied as proportional valves and can accordingly be put by the electronic control unit 28 into an arbitrary number of intermediate positions between their blocking position and their open position, in which intermediate positions they open up different-sized flow cross sections of the return line 34. The use of pressure reduction valves 32 employing proportional valve technology thus makes it possible to implement different pedal actuation characteristics (characteristic force/travel curve) by means of a variation, which can be made by the electronic control unit 28, of the trigger signal for these pressure reduction valves 32.

In a second possible embodiment, more-economical pressure reduction valves 32 are used, which are embodied as conventional switching valves and are triggerable in clocked fashion. The desired pedal actuation characteristic in this case can be varied by the electronic control unit 28 by way of the clock frequency and the opening duration of these pressure reduction valves 32.

With the method of the invention, it is also possible to trigger only selected pressure reduction valves 32 of the vehicle brake system, for instance only the pressure reduction valves 32 at the wheel brakes 20, 26 of the rear axle of the vehicle. Since on the one hand the brake pressures at the wheel brakes 20, 26 of the rear axle are quite low, especially during an adaptive speed and distance regulation (Automatic Cruise Control or ACC), and on the other hand via the pressure generator 38 a pressure fluid volume is supplied that leads to a brake pressure buildup at the wheel brakes 22, 24 of the front axle, no effect on the overall deceleration of the vehicle is perceptible to the driver.

It is understood that further additions or refinements of the exemplary embodiment are conceivable without departing from the fundamental concept of the invention.

The invention claimed is:

1. A method for controlling an electronically slip-controllable vehicle brake system, including:
   a master cylinder actuatable at least indirectly by a driver,
   a brake circuit, connected to the master cylinder, and having at least one wheel brake;
   an electronic control unit;
   a valve unit, triggerable by the electronic control unit, for modulating the brake pressure at a wheel brake of the vehicle brake system;
   a pressure generator, which is actuatable by a drive motor that is triggerable by the control unit;
   at least one sensor element, detecting an actuation of the master cylinder; and
   a pressure fluid reservoir, which is disposed between the valve unit for modulating the brake pressure in the wheel brakes and the intake side of the pressure generator,
   the method comprising the steps of:
   detecting an automatic braking event;
   detecting actuation of the master cylinder during the automatic braking event;
   upon detecting the actuation of the master cylinder during an automatic braking event, triggering at least one valve unit for modulating the brake pressure in a wheel brake in such a way that pressure fluid flows out of the wheel brake into the pressure fluid reservoir; and
   triggering in parallel with the at least one valve unit, the drive motor of the pressure generator to control the pressure drop at the wheel brake.

2. The method as defined by claim 1, wherein by the electronic control unit, the triggerings of the valve unit and of the drive motor of the pressure generator are adapted to one another in such a way that a vehicle deceleration is established, which corresponds to a maximum value of a vehicle deceleration corresponding to the actuation of the master cylinder or to a prevailing vehicle deceleration before the actuation of the master cylinder.

3. The method as defined by claim 2, wherein the valve unit for modulating the brake pressure of a wheel brake includes at least one proportional valve triggerable by the control unit.

4. The method as defined by claim 3, wherein only valve units for modulating the brake pressure of the wheel brakes of one axle of the vehicle, preferably the rear axle of the vehicle, are triggered.

5. The method as defined by claim 2, wherein the brake circuit includes a plurality of wheel brakes and associated valve units modulating the brake pressure of the wheel brake, each valve unit including at least one switching valve triggerable in clocked fashion relative to the valve units of the other wheel brakes triggerable by the control unit.

6. The method as defined by claim 2, wherein the valve unit for modulating the brake pressure of a wheel brake includes a pressure buildup valve hydraulically preceding the wheel brake and a pressure reduction valve downstream of the wheel brake.

7. The method as defined by claim 2, wherein only valve units for modulating the brake pressure of the wheel brakes of one axle of the vehicle, preferably the rear axle of the vehicle, are triggered.

8. The method as defined by claim 1, wherein by the electronic control unit, the triggerings of the valve unit and of the drive motor of the pressure generator are adapted to one another in such a way that a vehicle deceleration corresponding to the actuation of the master cylinder is established.

9. The method as defined by claim 8, wherein the valve unit for modulating the brake pressure of a wheel brake includes at least one proportional valve triggerable by the control unit.

10. The method as defined by claim 9, wherein only valve units for modulating the brake pressure of the wheel brakes of one axle of the vehicle, preferably the rear axle of the vehicle, are triggered.

11. The method as defined by claim 8, wherein the brake circuit includes a plurality of wheel brakes and associated valve units modulating the brake pressure of the wheel brake, each valve unit including at least one switching valve triggerable in clocked fashion relative to the valve units of the other wheel brakes triggerable by the control unit.

12. The method as defined by claim 8, wherein the valve unit for modulating the brake pressure of a wheel brake includes a pressure buildup valve hydraulically preceding the wheel brake and a pressure reduction valve downstream of the wheel brake.

13. The method as defined by claim 8, wherein only valve units for modulating the brake pressure of the wheel brakes of one axle of the vehicle, preferably the rear axle of the vehicle, are triggered.

14. The method as defined by claim 1, wherein the valve unit for modulating the brake pressure of a wheel brake includes at least one proportional valve triggerable by the control unit.

15. The method as defined by claim 14, wherein the valve unit for modulating the brake pressure of a wheel brake includes a pressure buildup valve hydraulically preceding the wheel brake and a pressure reduction valve downstream of the wheel brake.

16. The method as defined by claim 14, wherein only valve units for modulating the brake pressure of the wheel brakes of one axle of the vehicle, preferably the rear axle of the vehicle, are triggered.

17. The method as defined by claim 1, wherein the brake circuit includes a plurality of wheel brakes and associated valve units modulating the brake pressure of the wheel brake, each valve unit including at least one switching valve triggerable in clocked fashion relative to the valve units of the other wheel brakes triggerable by the control unit.

18. The method as defined by claim 17, wherein the valve unit for modulating the brake pressure of a wheel brake includes a pressure buildup valve hydraulically preceding the wheel brake and a pressure reduction valve downstream of the wheel brake.

19. The method as defined by claim 1, wherein the valve unit for modulating the brake pressure of a wheel brake includes a pressure buildup valve hydraulically preceding the wheel brake and a pressure reduction valve downstream of the wheel brake.

20. The method as defined by claim 1, wherein only valve units for modulating the brake pressure of the wheel brakes of one axle of the vehicle, preferably the rear axle of the vehicle, are triggered.

* * * * *